(12) United States Patent
Ahn et al.

(10) Patent No.: US 9,003,434 B2
(45) Date of Patent: Apr. 7, 2015

(54) SPINDLE STRUCTURE AND OPTICAL DISC DRIVE INCLUDING THE SPINDLE STRUCTURE

(71) Applicant: Toshiba Samsung Storage Technology Korea Corporation, Suwon-si (KR)

(72) Inventors: Cheol-woong Ahn, Seoul (KR); Nam-kook Baek, Suwon-si (KR); Sung-kyu Ha, Hwaseong-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/845,289

(22) Filed: Mar. 18, 2013

(65) Prior Publication Data
US 2013/0247076 A1  Sep. 19, 2013

(30) Foreign Application Priority Data
Mar. 19, 2012 (KR) ........................ 10-2012-0027903

(51) Int. Cl.
*G11B 17/028* (2006.01)
(52) U.S. Cl.
CPC ........ *G11B 17/0284* (2013.01); *G11B 17/0282* (2013.01); *G11B 17/0285* (2013.01)
(58) Field of Classification Search
CPC .... G11B 17/02; G11B 17/022; G11B 17/028; G11B 17/0282; G11B 17/0284; G11B 17/0285

USPC .................................................. 720/695–714
See application file for complete search history.

(56) References Cited

U.S. PATENT DOCUMENTS

| | | | |
|---|---|---|---|
| 4,855,990 A * | 8/1989 | Akiyama ...................... 369/265 |
| 5,457,676 A | 10/1995 | Park | |
| 6,252,843 B1 * | 6/2001 | Begley et al. ................. 720/708 |
| 6,430,145 B1 * | 8/2002 | Morimoto et al. ............ 720/707 |
| 2006/0268454 A1 * | 11/2006 | Nishide ..................... 360/99.12 |
| 2011/0072447 A1 | 3/2011 | Lee et al. | |

FOREIGN PATENT DOCUMENTS

| KR | 10-0158854 | 8/1998 |
| KR | 10-0176575 | 11/1998 |
| KR | 10-2002-0061273 | 7/2002 |
| KR | 10-2011-0021067 | 3/2011 |

OTHER PUBLICATIONS

English translation of KR 100176575 B1.*

* cited by examiner

*Primary Examiner* — Nathan Danielsen
(74) *Attorney, Agent, or Firm* — NSIP Law

(57) ABSTRACT

A spindle structure for an optical disc and an optical disc drive employing the spindle structure are provided. The spindle structure includes a spindle motor having a rotation axis, a spindle that is coupled to the rotation axis, and a sliding cone coupled to the spindle and inserted into a center hole of the optical disc. The sliding cone includes a plurality of hook-shaped guide rods extended toward the spindle, and the spindle includes guide holes, to which the plurality of hook-shaped guide rods are inserted into and coupled.

11 Claims, 8 Drawing Sheets

SPINDLE STRUCTURE AND OPTICAL DISC DRIVE INCLUDING THE SPINDLE STRUCTURE

CROSS-REFERENCE TO RELATED APPLICATION(S)

This application claims the benefit under 35 USC §119(a) of Korean Patent Application No. 10-2012-0027903, filed on Mar. 19, 2012, in the Korean Intellectual Property Office, the entire disclosure of which is incorporated herein by reference for all purposes.

BACKGROUND

1. Field

The following description relates to an optical disc drive, and more particularly, to a spindle structure on which a disc is mounted.

2. Description of Related Art

A spindle structure of an optical disc drive typically includes a spindle or a turn table on which a disc is mounted, a rotational chuck fastening the disc to the spindle, and a spindle motor for rotating the spindle.

A chucking structure of an optical disc drive typically includes a magnetic chucking structure. In the magnetic chucking structure, a magnet is usually provided on a rotational chuck to stably fasten a disc to the spindle, and a yoke corresponding to the magnet is provided on the spindle.

However, it is difficult to avoid a collision between the spindle and the rotational chuck when chucking the disc in the magnetic chucking structure. This collision typically generates noise. To chuck the disc as quietly as possible, research is needed for reducing a chucking noise.

Neodymium (Nd) may be used as a material for the magnet. However, neodymium is an expensive rare earth material and is a considerable burden on manufacturing costs for the chucking structure. Accordingly, research is needed for developing chucking structures that are capable of not only stably chucking discs but also decreasing manufacturing costs thereof.

SUMMARY

In an aspect, there is provided a spindle structure including a spindle motor comprising a rotation axis, a spindle that is coupled to the spindle motor and which is configured to have an optical disc mounted thereon, and a sliding cone coupled to the spindle and configured to be inserted into a center hole of the optical disc, wherein the sliding cone comprises a plurality of hook-shaped guide rods extended toward the spindle, and the spindle comprises a plurality of guide holes configured to receive the plurality of hook-shaped guide rods to securely couple the sliding cone and the spindle.

An end portion of each hook-shaped guide rod may comprise a projection that is configured to securely fasten the plurality of hook-shaped guide rods into the plurality of guide holes, and the spindle structure may further comprise a compression spring elastically supporting the sliding cone and which is disposed between the spindle and the sliding cone.

The spindle structure may further comprise a clamper configured to fasten the optical disc to the spindle, and a chucking spring configured to press a top surface of the clamper.

The chucking spring may comprise a pressing portion pressing the top surface of the clamper, and a plurality of flexible portions formed around the pressing portion and providing an elastic force toward the clamper.

The spindle structure may further comprise a lubricating element interposed between the pressing portion and the clamper.

A projected rotation supporting portion in contact with the lubricating element may be formed on the top surface of the clamper.

In an aspect, there is provided an optical disc drive including an optical pickup device corresponding to a disc comprising a center hole, a spindle structure comprising a spindle on which the disc is configured to be mounted, a sliding cone inserted into the center hole and comprising a plurality of hook-shaped guide rods which are coupled to a plurality of guide holes of the spindle, and a spindle motor rotating the spindle, and a clamper fastening the disc to the spindle.

A compression spring may be interposed between the sliding cone and the spindle.

The optical disc drive may further comprise a chucking spring pressing a top surface of the clamper, the clamper fastening the disc to the spindle.

The chucking spring may be a plate spring comprising a pressing portion pressing the top surface of the clamper.

The optical disc drive may further comprise a lubricating element interposed between the pressing portion and the clamper.

A projected rotation supporting portion in contact with the lubricating element may be formed on the top surface of the clamper.

In an aspect, there is provided a spindle structure including a spindle comprising a sliding cone that is configured to receive a center of an optical disc mounted thereon, a spindle motor configured to ascend and descend the spindle, a clamper disposed above the spindle and configured to clamp down on the disc to securely fasten the disc to the spindle, and a chucking spring disposed above the clamper and configured to press the spindle in a direction against a lifting force caused by the spindle motor, thereby reducing or offsetting the lifting force.

The chucking spring may comprise a pressing portion, a rim disposed around the pressing portion, and a plurality of flexible portions arranged between the rim and the pressing portion.

The sliding cone may comprise a plurality of hook-shaped guide rods extended toward the spindle, and the spindle comprises a plurality of guide holes configured to receive the plurality of hook-shaped guide rods to securely couple the sliding cone and the spindle.

Other features and aspects may be apparent from the following detailed description, the drawings, and the claims.

Figure 1:
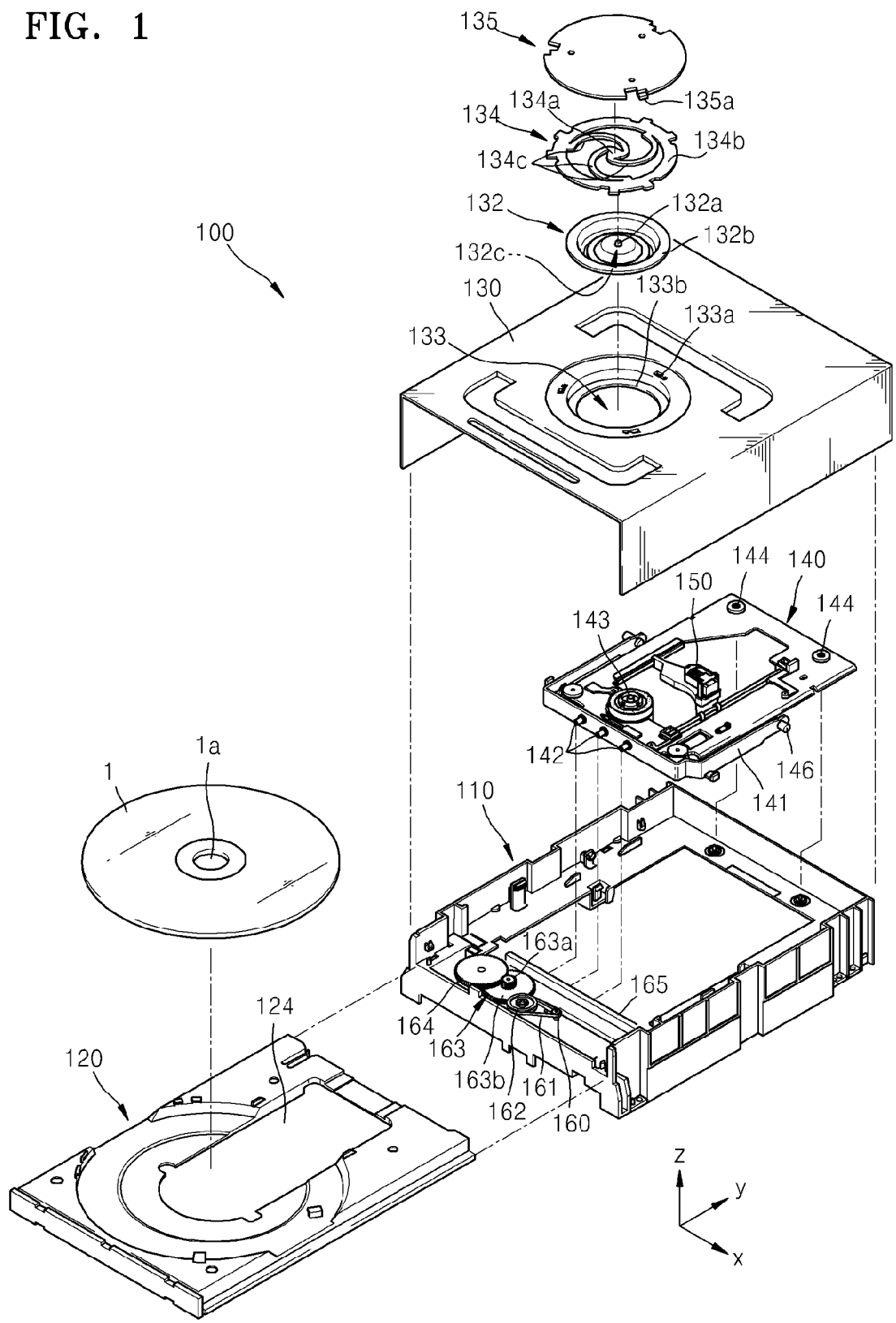
FIG. 1 is a diagram illustrating an example of an optical disc drive including a spindle structure for an optical disc.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an optical disc drive 100 including a spindle structure for an optical disc.

Referring to FIG. 1, the disc drive 100 includes a main frame 110, a tray 120 passing in and out of the inside of the main frame 110, and a cover 130 that is coupled to the main frame and which covers the inside of the main frame 110 so as not to expose the main frame 110. For example, the optical disc drive may be used in a compact disc (CD) player, a digital versatile disc (DVD) player, a Blu-ray player, and the like.

On the cover 130 is an opening 133 and a ring-shaped skirt portion 133b around the opening 133. An optical disc 1 including a center hole 1a is mounted on the tray 120. A clamper 132 for fastening the optical disc 1 to a spindle 143 is mounted on the cover 130. In this example, the clamper 132 includes a projected rotation supporting portion 132a on a top center thereof pressed by a pressing portion 134a of a chucking spring 134. The clamper 132 also includes a ring-shaped flange 132b corresponding to the ring-shaped skirt portion 133b around the opening 133, and a cylindrical coupling portion 132c (refer to FIG. 8) inserted into a center space portion of a sliding cone 143a.

The clamper 132 is mounted on the inside of the opening 133 formed on the cover 130, and the chucking spring 134 elastically biasing the clamper 132 in a downward direction is located on top of the clamper 132. A cap 135 closing the opening 133 is mounted on the chucking spring 134. The chucking spring 134 may be a plate-shaped spring including the pressing portion 134a pressing a center portion of the top of the clamper 132, and a rim 134b fastened to the opening 133. The chucking spring 134 also includes a plurality of flexible portions 134c located inside the rim 134b. A plurality of fastening grooves 133a are provided on an outer periphery of the opening 133, and a plurality of L-shaped fastening steps 135a (refer to FIG. 2) fastened to the fastening groove 133a are projected around the cap 135.

An open window 124 is formed on the tray 120 and provides a space where an optical pickup unit 150 may operate. The disc drive 100 also includes a main base 140 that is pivotable vertically to the main frame 110. The disc drive 100 also includes a pivotable sub base 141 guiding vertical movement of the main base 140 on a pivot 146 coupled to the main frame to be pivotable. Located on the main base 140 is the spindle motor 147 (refer to FIG. 2) driving the spindle 143 for rotating the optical disc at a high speed and the optical pickup unit 150 emitting light to the optical disc 1 and receiving the light reflected by the optical disc 1 to record information on the optical disc 1 and to play recorded information.

The main base 140 is fastened to the main frame 110 to be flexibly and elastically pivotable using fastening groove 144 that is provided at a rear end portion of the main base 140, and interposing elastic rubber spacers (not shown) therebetween. The fastening groove 144 may be fastened using screws. When the main frame 110 ascends, the disc 1 mounted on the spindle 143 is pressed by the clamper 132.

Unlike a general magnetic clamping structure, the spindle 143 does not have a yoke. In this case, because the clamper 132 is elastically biased by the chucking spring 134, the clamper 132 may press the disc 1 with enough pressure to securely fasten the disc 1 to the spindle 143. On a fore end portion of the main base 140, the pivotable sub base 141 is coupled to a main slider 165 in such a way that the main base 140 may be pivoted by the main slider 165, which reciprocates in synchronization with operation or actuation of the tray 120. On an intermediate portion of the pivotable sub base 141 is a plurality of guide pins 142 interfering in a vertical direction toward the main slider 165.

A power transfer system may be used to initiate and drive operations of the tray 120 and the main slider 165. For example, the power transfer system may include a driving pulley 160, a rubber belt 161, a driven pulley 162, a main gear, and a tray driving gear 164 driven by a driving motor (not shown).

Figure 2:
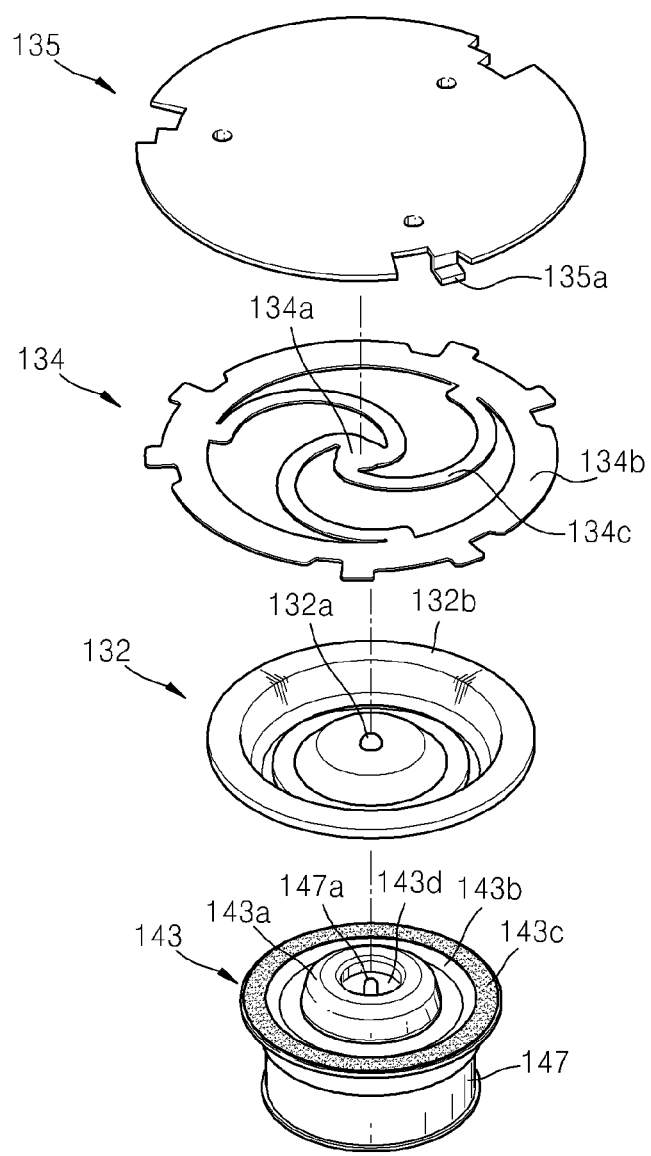
FIG. 2 is a diagram illustrating an example of a spindle structure.

FIG. 2 illustrates an example of a spindle structure.

Referring to FIG. 2, the spindle 143 is coupled to the spindle motor 147 including the rotation axis 147a, and the clamper 132 which may be used to fasten a disc to the spindle 143 is located on the spindle 143. A sliding cone 143a is included in the center hole 1a (refer to FIG. 1) of the disc 1 and protrudes upwards from the spindle 143. In this example, the sliding cone 143a has a circular space portion 143d in a center thereof and is fastened to be movable elastically vertical to the spindle 143.

Figure 3:
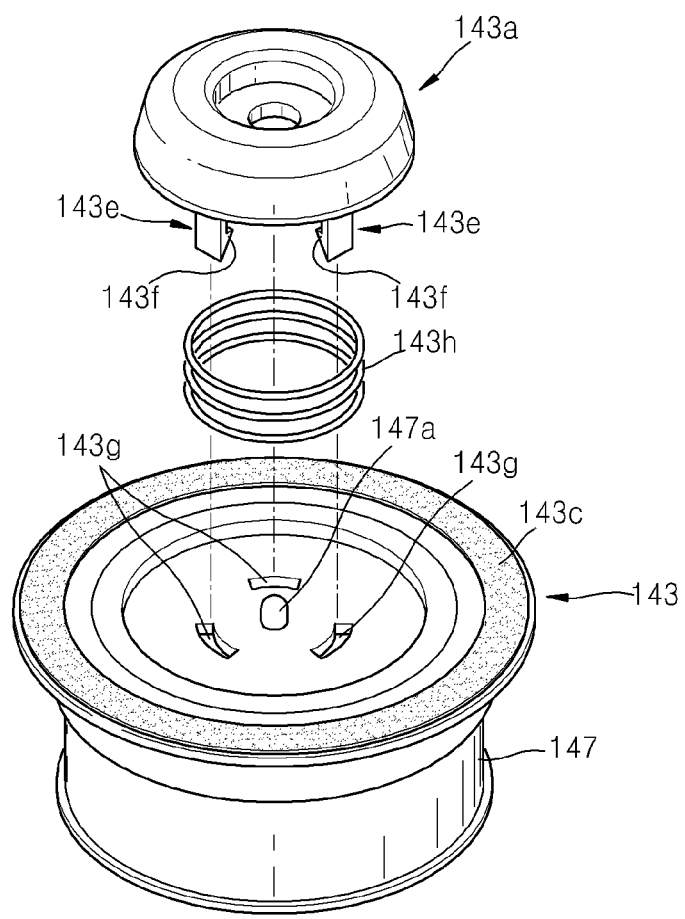
FIG. 3 is a diagram illustrating an example of a turn table mounted on a spindle motor of the spindle structure.
Figure 4:
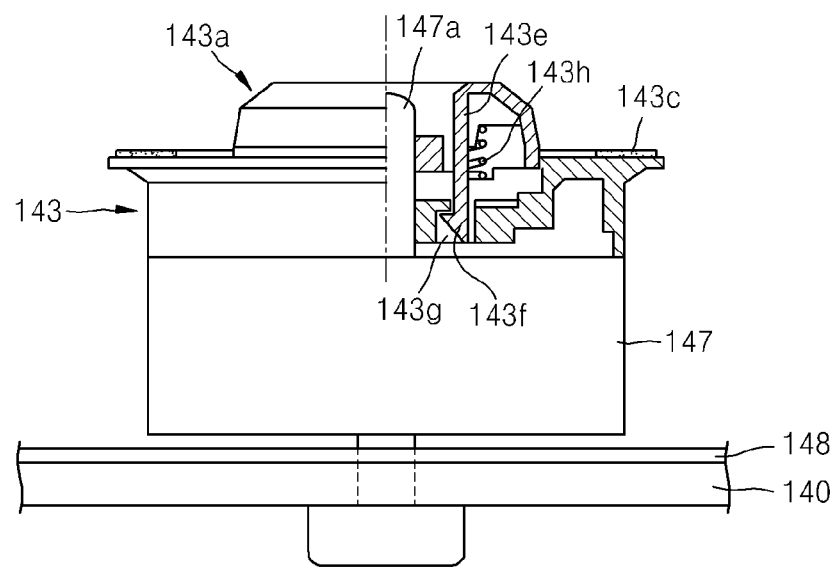
FIG. 4 is a diagram illustrating an example of a coupled state of the spindle motor with the turn table of the spindle structure.
Figure 5:
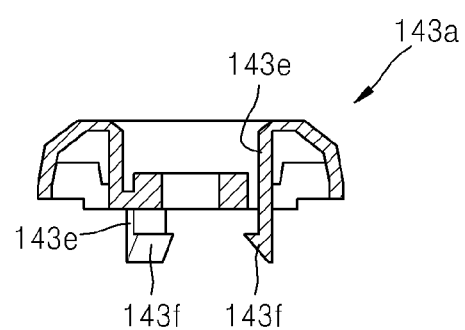
FIG. 5 is a diagram illustrating an example of a sliding cone applied to the spindle structure.

FIG. 3 illustrates an example of a turn table mounted on a spindle motor of the spindle structure, FIG. 4 illustrates an example of a coupled state of the spindle motor with the turn table of the spindle structure, and FIG. 5 illustrates an example of a sliding cone applied to the spindle structure.

Referring to FIGS. 3 and 4, the spindle 143 is mounted on the rotation axis 147a of the spindle motor 147. On the top center of the spindle 143, the sliding cone 143a is coupled thereto to be capable of ascending and descending to a desired vertical height. For example, the sliding cone 143a, as shown in FIG. 5, includes a hook-shaped guide rod 143e with a projection 143f formed on a fore end portion thereof and which extends toward the spindle 143. In addition, the spindle 143 includes a guide hole 143g to receive the hook-shaped guide rod 143e to be inserted thereto. In this example, a coil-shaped compression spring 143h is provided between the spindle 143 and the sliding cone 143a in such a way that the sliding cone 143a is elastically biased upwardly in a direction that is toward the clamper 132.

Figure 6:
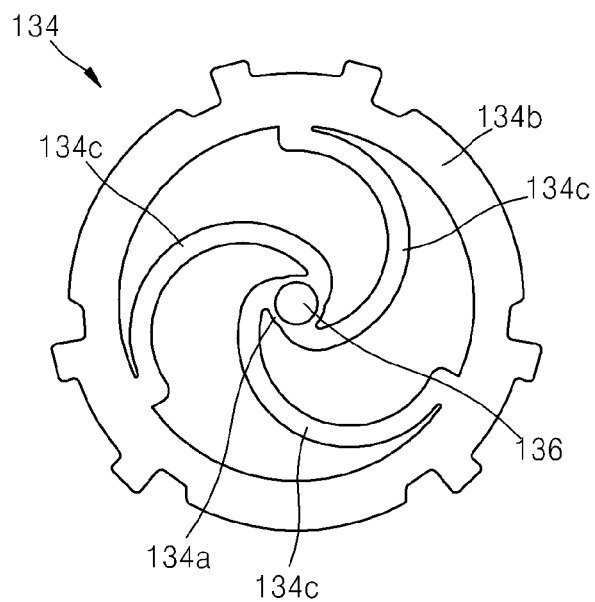
FIG. 6 is a diagram illustrating an example of a plate-shaped chucking spring applied to the spindle structure.
Figure 7:
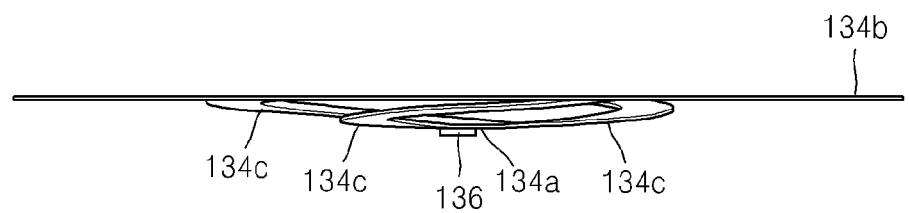
FIG. 7 is a diagram illustrating another example of the plate-shaped chucking spring applied to the spindle structure.

Referring back to FIG. 2, on top of a top surface 143b of the spindle 143 surrounding the sliding cone 143a is attached a slip-resistant ring-shaped pad 143c that is in contact with a periphery portion of a bottom of the center hole 1a of the disc 1. The clamper 132 located on top of the spindle 143 fastens the disc 1 to the spindle 143 due to the chucking spring 134. For example, the chucking spring 134, as shown in FIGS. 6 and 7, may include the pressing portion 134a pressing the projected rotation supporting portion 132a of the clamper 132, the rim 134*b* surrounding the pressing portion 134*a*, and the flexible portions 134*c* arranged therebetween around the pressing portion 134*a*. As an example, the flexible portions 134*c* may be arranged with equiangular intervals and the flexible portions 134*c* may be formed in a spiral shape. The pressing portion 134*a*, as shown in FIG. 7, may be projected downwardly toward the rotation supporting portion 132*a*.

Figure 8:
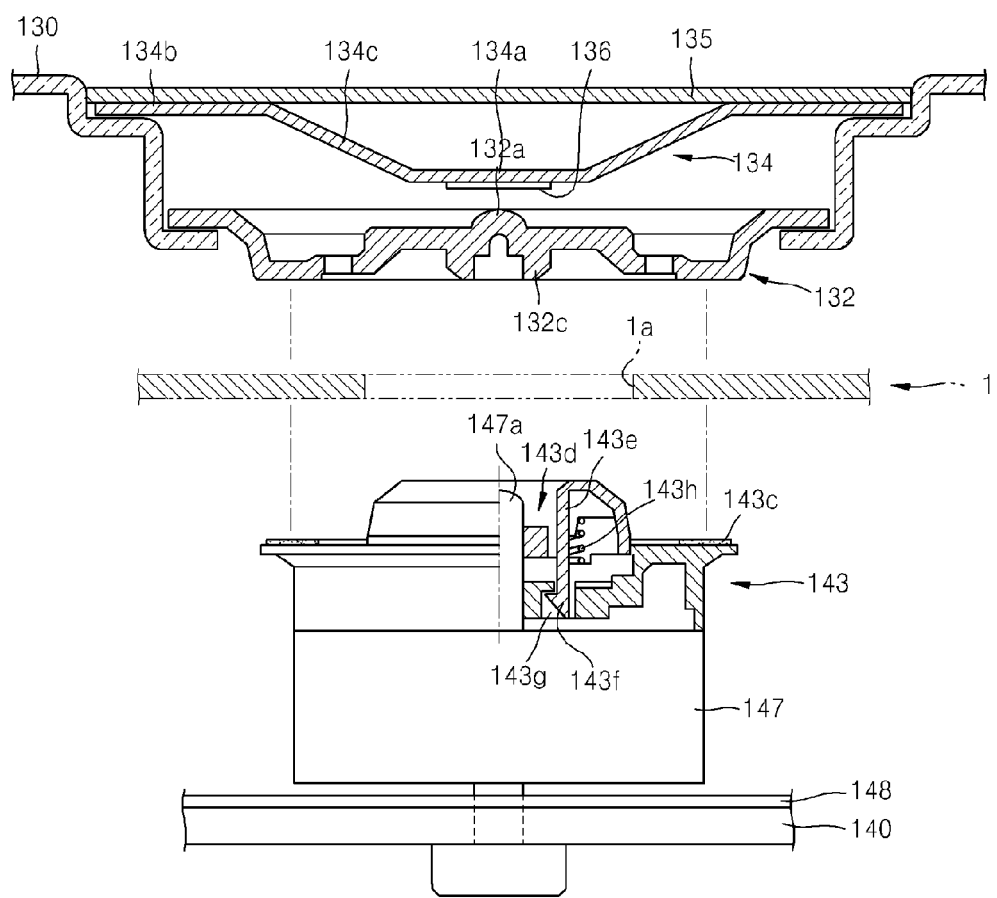
FIG. 8 is a diagram illustrating an example of the turn table, the sliding cone, the clamper, and the chucking spring in a chucking structure.

FIG. 8 illustrates an example of the turn table, the sliding cone, the clamper, and the chucking spring in a chucking structure.

Referring to FIG. 8, the disc 1 including the center hole 1*a* is mounted on the spindle 143. In the center of the spindle 143, there is located the sliding cone 143*a* inserted into the center hole 1*a* of the disc 1. The sliding cone 143*a*, as described above, includes a plurality of the hook-shaped guide rods 143*e* inserted into the guide hole 143*g*, such that the guide rod 143*e* is not separated from the guide hole 143*g* due to the projection 143*f* of the fore end portion of the guide rod 143*e*. Accordingly, the sliding cone 143*a* that is elastically biased by the compression spring 143*h* may be inserted into the center hole 1*a* of the disc 1 with a proper elastic force.

Furthermore, because a lubricating element 136 is attached to the pressing portion 134*a* of the chucking spring 134 pressing the clamper 132, the pressing portion 134*a* is not in direct contact with the rotation supporting portion 132*a*. Accordingly, the lubricating element 136 rubs against the rotation supporting portion 132*a*. For example, the lubricating element 136 may be formed of a smoothing material capable of reducing friction and abrasion of the rotation supporting portion 132*a* to allow the clamper 143 to be smoothly rotated.

As described herein, the spindle motor 147 is installed on the main base 140. A motor base 148 supporting a bottom of the spindle motor 147 may be directly fastened to the main base 140. According to various aspects, the spindle 143 does not have a chucking magnet installed as in the conventional art. Instead, the chucking spring 134 generates a chucking force by pressing the clamper 132 to the spindle 143.

Furthermore, a sliding cone inserted adjacent to a top end of a spindle motor is not separated from an axis of the spindle motor due to a yoke fastened to a fore end portion of the axis. According to various aspects, a yoke may be excluded from the disc drive. Instead, a hook-shaped guide rod 143*e* inserted and coupled to the spindle 143 may be provided on a bottom of the sliding cone 143*a*, thereby stably mounting the sliding cone 143*a* on the spindle 143.

Figure 9:
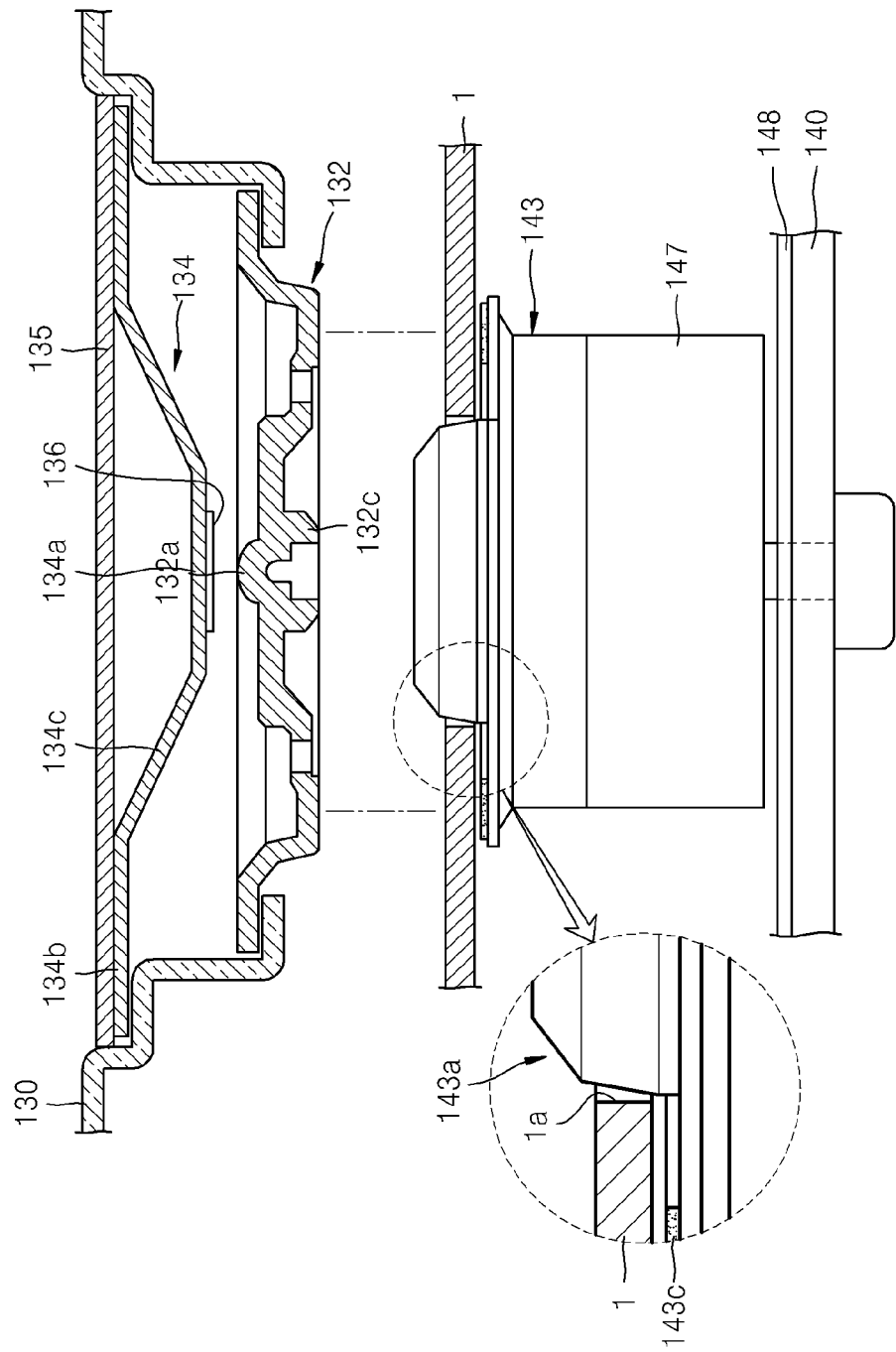
FIG. 9 is a diagram illustrating an example of a state of a disc before being chucked in the chucking structure.
Figure 10:
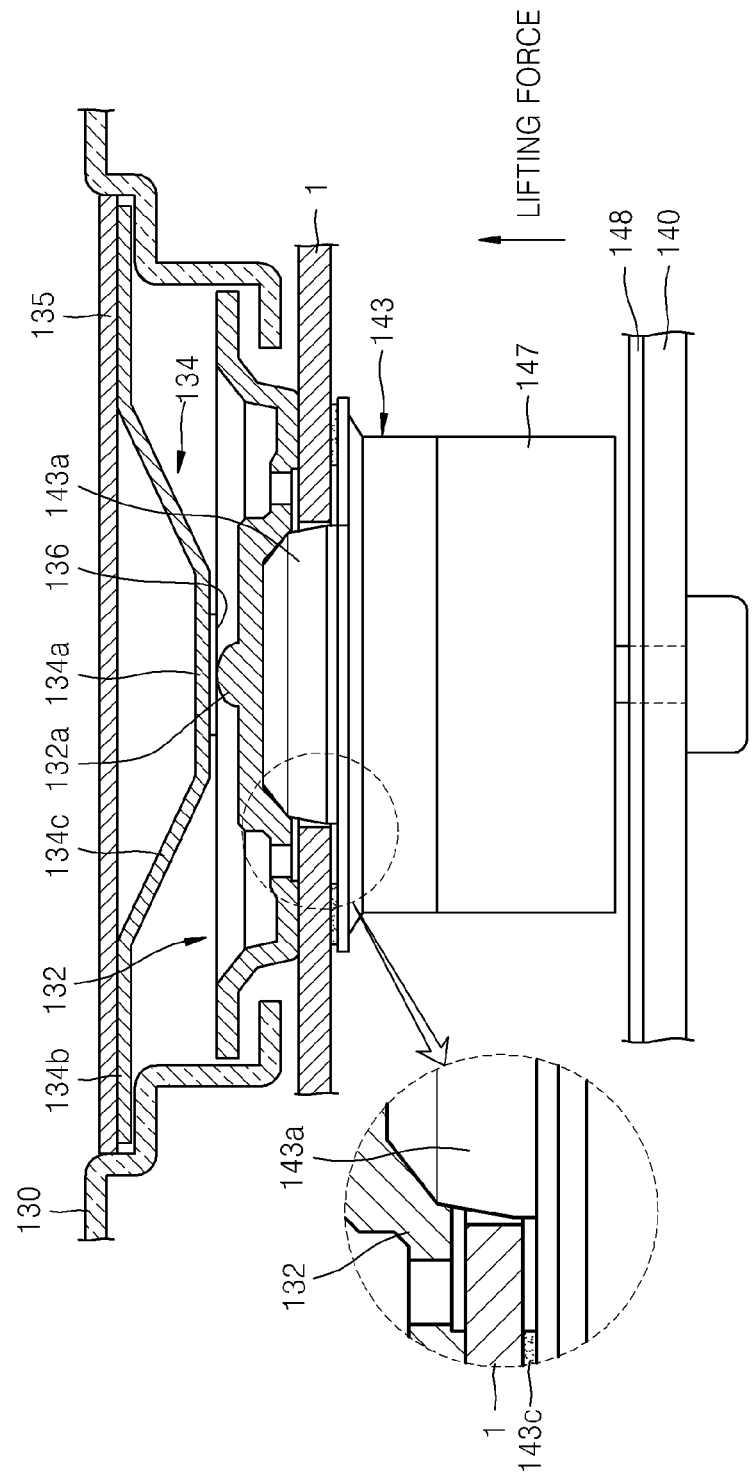
FIG. 10 is a diagram illustrating an example of a state of the disc after being chucked in the chucking structure.

FIG. 9 illustrates an example of a state before mounting the disc 1 on the spindle structure, and FIG. 10 illustrates an example of a state in which the disc 1 is fastened to the spindle 143 by the clamper 132.

As shown in FIG. 9, in a state in which the disc 1 is on the spindle 143, the disc 1 may be separated from the top surface 143*c* of the spindle by the sliding cone 143*a*, which is elastically biased. When the disc 1 is chucked by the clamper 132, the disc 1 may be closely attached to the top surface 143*c* of the spindle 143 by the clamper 132 by the clamper 132 pressing downwardly on the sliding cone 143*a* inserted into the center hole 1*a* of the disc 1. According to various aspects, when the disc 1 is closely attached to the spindle 143 by the clamper 132, a location of the sliding cone 143*a* may be lowered toward the spindle 143 and the sliding cone 143*a* may elastically biased by the compression spring 143*h* much more securely than before the clamping of disc 1. As a result thereof, top and bottom surfaces of the disc 1 are securely compressed and fastened by the clamper 132 and the spindle 143, in which the sliding cone 143*a* is inserted into the center hole 1*a* of the disc 1 due to a force applied to the bottom of the sliding cone 143*a* by the compression spring 143*h*. In this example, the applied force may be used to stably maintain a rotational center of the disc 1.

According to various aspects, a clamper chucks a disc on a spindle by applying a load to the spindle from a top to a bottom of a spindle motor. Also, a sliding cone located in a center hole holds a rotational center of the disc due to an elastic force of a compression spring applied simultaneously with pressing the disc by the clamper, thereby stably rotating the disc at a high speed without a buildup of magnetic flux.

In contrast, in case of a general spindle structure such as a magnetic clamping structure, a trust magnet is provided inside a spindle motor. The trust magnet, as known in the art, is for reducing or offsetting an axial force that is caused by a rotor of the spindle motor progressing toward a spindle (refer to a direction of an arrow in FIG. 10) by a lifting force occurring while rotating at a high speed. However, according to various aspects, the chucking spring 134 presses the spindle 143 in a direction against a lifting force, thereby reducing or offsetting the lifting force. Accordingly, it is possible to exclude a trust magnet.

That is, instead of a magnetic lifting force controlling structure such as the trust magnet, a non-magnetic lifting force controlling structure is provided by a chucking spring 134 which causes the disc 1 to be chucked. According to various aspects, the chucking spring 134 has functions of chucking a disc and controlling a lifting force. Furthermore, it is possible to exclude a yoke, a clamping magnet fastened to an axis of a spindle motor or a spindle by press-fitting or bonding, and particularly, an expensive magnet such as neodymium. Accordingly, it is possible to simplify a configuration of the spindle structure and to reduce manufacturing costs according thereto.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A spindle structure comprising:
   a spindle motor comprising a rotation axis;
   a spindle that is coupled to the spindle motor and which is configured to have an optical disc mounted thereon;
   a sliding cone coupled to the spindle and configured to be inserted into a center hole of the optical disc, the sliding cone comprising a compression spring between the sliding cone and the spindle such that the sliding cone is elastically biased;
   a clamper configured to fasten the optical disc to the spindle, the clamper comprising a projected rotation supporting portion protruding from a top center thereof and a cylindrical coupling protruding around a bottom center thereof; and
   a chucking spring comprising a flat plate-shape on a top surface thereof and comprising a pressing portion protruding from a bottom surface thereof and configured to press a top surface of the projected rotation supporting portion of the clamper, wherein
   the sliding cone and clamper are elastically biased by the chucking spring which pushes the clamper towards the optical disc and which also pushes the projected rotation supporting portion of the clamper which forces the cylindrical coupling protruding from the bottom of the clamper to be held in an inner portion of the sliding cone, causing a predetermined amount of pressure to secure the optical disc to the sliding cone during operation without the use of magnets.

2. The spindle structure of claim 1, wherein the chucking spring comprises a plurality of flexible portions formed around the pressing portion and providing an elastic force toward the clamper.

3. The spindle structure of claim 2, further comprising a lubricating element interposed between the pressing portion and the clamper.

4. The spindle structure of claim 3, wherein the lubricating element is disposed in contact with the projected rotation supporting portion.

5. An optical disc drive comprising:
   an optical pickup device corresponding to a disc comprising a center hole;
   a spindle structure comprising a spindle on which the disc is configured to be mounted, a sliding cone inserted into the center hole and comprising a compression spring between the sliding cone and the spindle such that the sliding cone is elastically biased, and a spindle motor rotating the spindle;
   a clamper fastening the disc to the spindle, the clamper comprising a projected rotation supporting portion protruding from a top center thereof and a cylindrical coupling protruding around a bottom center thereof; and
   a chucking spring comprising a flat plate-shape on a top surface thereof and comprising a pressing portion protruding from a bottom surface thereof and configured to press a top surface of the projected rotation supporting portion of the clamper, wherein
   the sliding cone and clamper are elastically biased by the chucking spring which pushes the clamper towards the optical disc and which also pushes the projected rotation supporting portion of the clamper which forces the cylindrical coupling protruding from the bottom of the clamper to be held in an inner portion of the sliding cone, causing a predetermined amount of pressure to secure the optical disc to the sliding cone during operation without the use of magnets.

6. The optical disc drive of claim 5, wherein the chucking spring is a plate spring.

7. The optical disc drive of claim 6, further comprising a lubricating element interposed between the pressing portion and the clamper.

8. The optical disc drive of claim 7, wherein the lubricating element is disposed in contact with the projected rotation supporting portion.

9. A spindle structure comprising:
   a spindle comprising a sliding cone that is configured to receive a center of an optical disc mounted thereon, the sliding cone being elastically biased by a compression spring disposed between the sliding cone and the spindle;
   a spindle motor configured to ascend and descend the spindle;
   a clamper disposed above the spindle and configured to clamp down on the disc to securely fasten the disc to the spindle, the clamper comprising a projected rotation supporting portion protruding from a top center thereof and a cylindrical coupling protruding around a bottom center thereof; and
   a chucking spring disposed above the clamper and configured to press the spindle in a direction against a lifting force caused by the spindle motor, thereby reducing or offsetting the lifting force, the chucking spring comprising a flat plate-shape on a top surface thereof and comprising a pressing portion protruding from a bottom surface thereof and configured to press a top surface of the projected rotation supporting portion of the clamper, wherein
   the sliding cone and clamper are elastically biased by the chucking spring which pushes the clamper towards the optical disc and which also pushes the projected rotation supporting portion of the clamper which forces the cylindrical coupling protruding from the bottom of the clamper to be held in an inner portion of the sliding cone, causing a predetermined amount of pressure to secure the optical disc to the sliding cone during operation without the use of magnets.

10. The spindle structure of claim 9, wherein the chucking spring comprises a rim disposed around the pressing portion, and a plurality of flexible portions arranged between the rim and the pressing portion.

11. The spindle structure of claim 9, wherein the sliding cone comprises a plurality of hook-shaped guide rods extended toward the spindle, and the spindle comprises a plurality of guide holes configured to receive the plurality of hook-shaped guide rods to securely couple the sliding cone and the spindle.

* * * * *